Jan. 11, 1927. 1,614,083
V. D. PLANTICO
DOG HARNESS
Filed Oct. 11, 1926   2 Sheets-Sheet 1
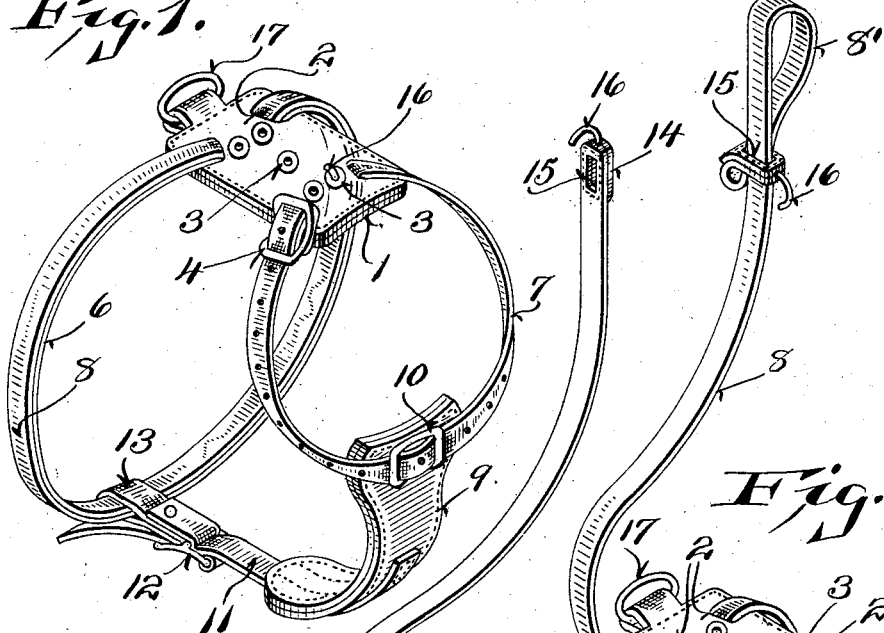
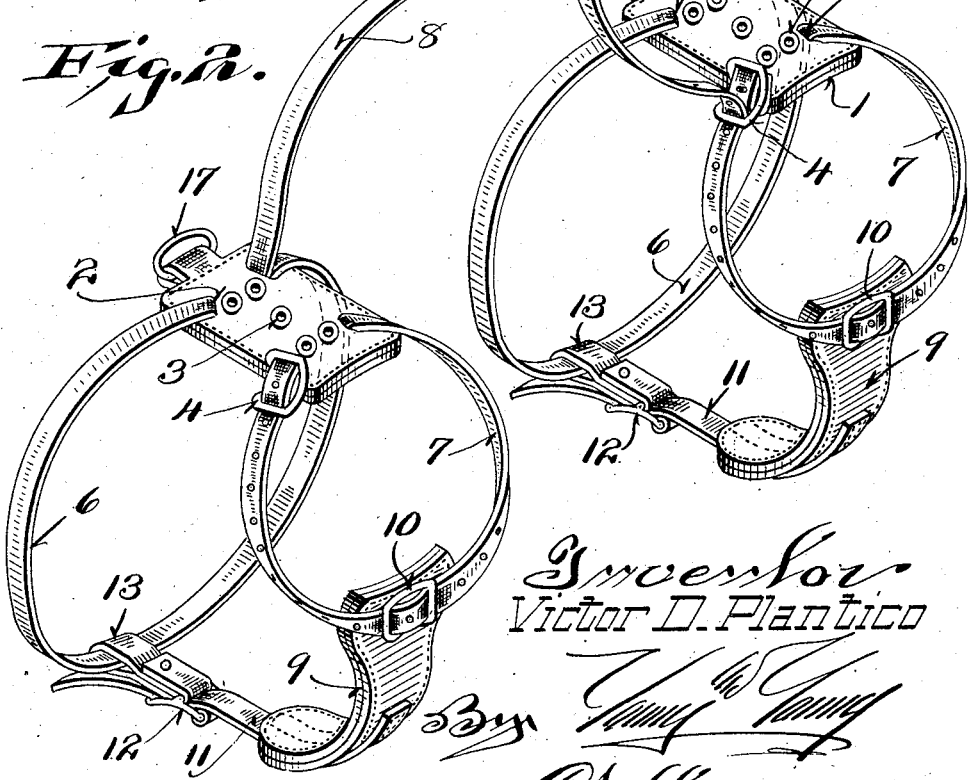
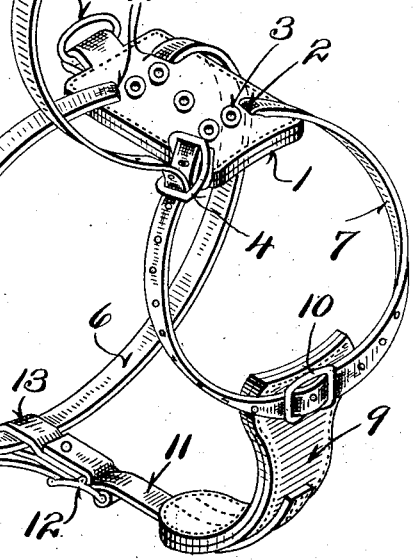
Inventor
Victor D. Plantico

Jan. 11, 1927.  V. D. PLANTICO  1,614,083
DOG HARNESS
Filed Oct. 11, 1926    2 Sheets-Sheet 2

Inventor
Victor D. Plantico

Patented Jan. 11, 1927.

UNITED STATES PATENT OFFICE.

VICTOR D. PLANTICO, OF MANITOWOC, WISCONSIN.

DOG HARNESS.

Application filed October 11, 1926. Serial No. 140,873.

This invention relates to a dog harness.

Objects of this invention are to provide a dog harness which is so constructed that it is impossible for the dog to work out of the harness, and which also permits the wide adjustment of the harness to accommodate growing dogs. This invention, therefore, contemplates broadly a harness which may be used for a dog for a material length of time, as distinguished from the usual harnesses which are discarded after one or two weeks' wear in actual practice.

Further objects are to provide a harness which is comfortable for the dog, which does not detract from the appearance of the animal, and which may be easily applied and adjusted to the exact needs of the dog.

Further objects are to provide a novel form of dog harness which is so constructed that the harness provides in one position of adjustment, a choke collar for obstreperous dogs, so that as the dog pulls upon the harness against the lead strap his wind is gradually cut off and he is forced to obey, and to provide the harness with means to permit its adjustment so that a portion may be used as an ordinary lead strap without the choke collar effect.

Further objects are to provide a novel form of harness which has the characteristics noted above and yet in which provision is made for holding the lead strap wrapped around the harness and securely positioned so that it is out of the way and yet is available whenever needed.

An embodiment of the invention is shown in the accompanying drawings in which:—

Figure 1 is a perspective view of the harness as it appears without any projecting lead strap;

Figure 2 shows the harness when it is used with one of its portions extended as a lead strap;

Figure 3 is a view similar to Figure 2, but showing the harness so adjusted as to provide a choke collar;

Figure 4:
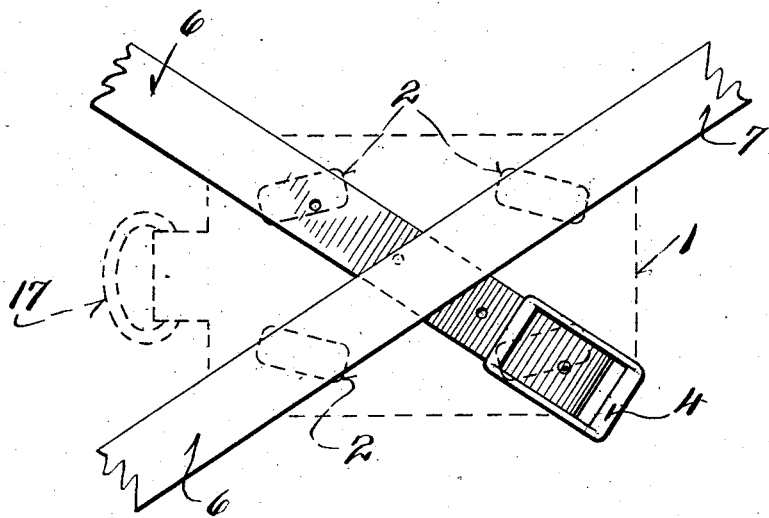
Figure 4 is a top view of the crossing straps with the upper pad shown in dotted lines.

Referring to the drawings, it will be seen that the harness comprises an upper pad 1 through which the one continuous strap is threaded by passing it into the slots 2 arranged at the four corners of the pad. Further, it is to be noted that the pad is provided with a plurality of eyelets 3 which are preferably reinforced, as shown.

Figure 5:
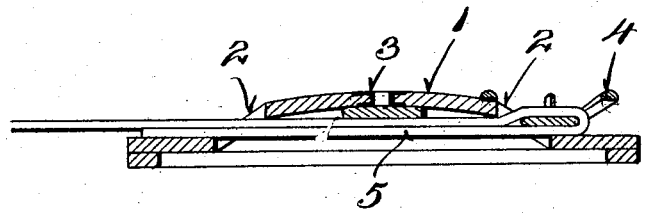
Figure 5 is a sectional view through the upper pad.

A single, continuous strap is threaded through these several slots 2, as indicated in the first three figures and in Figure 4 of the drawings. This continuous strap is provided with an adjustable buckle 4 at its forward end, and the end of the strap is tucked beneath the pad, as indicated at 5 in Figure 5. This strap may be provided with apertures so that the buckle can be adjusted thereon to provide for an additional, limited adjustment of the harness. However, the major adjustment is secured by means hereinafter described. The strap extends from the buckle downwardly through one of the forward slots 2 diagonally across the underside of the pad 1, and outwardly through the diagonally opposed slot. It then passes around the dog's body forming the loop 6 and upwardly to the pad. Thereafter, it passes through the other diagonal slots 2 and is looped around the neck of the dog to form the forward loop 7. The end of the strap is passed through the buckle 4 and is extended to form a lead strap 8.

This lead strap is capable of being used in several different ways. For example, as shown in Figure 2, it may be passed through two of the slots 2 in the pad 1 and extend outwardly, as shown in such figure. In this condition, the lead strap does not tighten the collar of the dog as it is locked by the buckle, but acts, in reality, as a lead strap.

In order to hold the collar loop 7 and the body loop 6 in their relative positions, a martingale is arranged, as shown in Figures 1, 2, and 3. This martingale consists of a front member 9 provided with an attached buckle 10 through which the collar loop 7 is threaded so as to hold it in correct central adjustment. From the rear of this member 9, an adjustable strap 11 passes through a buckle 12 carried by a loop 13 through which the body loop 6 is threaded. Thus, the spacing of the lower ends of the collar loop and the body loop may be adjusted to accommodate dogs of different lengths.

When it is desired to use the harness as a choke collar for unruly dogs, it is merely necessary to slip the lead strap 8 from the slots and from one portion of the buckle 4, as shown in Figure 3, so that it is not locked by either the buckle or the body portion. Under these conditions, it is clear that as the dog pulls against the lead strap that the collar loop will be contracted by the free sliding of the strap through the buckle 4 and, consequently, the dog will be choked and can be readily handled.

It is to be noted that the free end of the lead strap 8 is provided with a reenforced terminal portion 14 which is provided with a rectangular aperture 15 and with a prong 16. When the harness is used either as an ordinary lead harness or as a choke collar harness, it may be found convenient to loop the lead strap and pass it through the aperture 15 in the terminal portion 14 to form a hand grip or loop 8', as shown in Figure 3, so that a very secure hold of the strap is afforded.

When the harness is used as an ordinary harness and without the necessity of a lead strap, this member may be easily stored or retained in an out-of-the-way position, as shown in Figure 1. For example, when Figures 2 and 1 are compared, it will be seen that the lead strap 8 is wrapped outside of the body loop 6 and the terminal portion of the strap 8 is threaded through the appropriate diagonal slot 2. The hook 16, as shown in Figure 1, is then hooked upwardly through one of the eyelets 3, thus locking the strap in position and giving a neat and finished appearance to the entire harness.

Further, as the dog grows, it is easy to provide for this additional size. For example, the hook 16 is detached from the eyelet 3, as shown in Figure 1, and the body loop and collar loop are extended. This positions the hook 16 adjacent the loop 13, for example, and the hook may be hooked over the edge of the loop 13. Additional growth of the dog can be accommodated by further loosening the body loop and collar loop. Under these conditions, the end of the lead strap 8 will then be beneath the body portion or upper pad 1 and the hook 16 may then be engaged in one of the eyelets 3. In this condition, it is to be noted that the lead strap 8 is not looped around the body strap, as in Figure 1. Instead, there is only one thickness of strap forming the body loop 6. Thus, provision is made for a material change in the size of the dog by this harness. Further, the strap 11 may be adjusted in the buckle 12 to provide additional spacing between the collar loop and the body loop.

Preferably, the body portion or upper pad 1 is extended rearwardly and carries an attaching ring 17 by means of which the dog may be chained to the kennel.

In actual trials conducted with this harness, it has been found that it will fit dogs differing greatly in size and that it is comfortable and does not annoy the dog.

It has been found further that it is impossible for the most active dog to free himself from the harness.

Further, it will be seen that provision is made for leading the dog in an ordinary manner by means of the lead strap and, if desired, the adjustments may be so made, as described in detail above, as to provide a choke collar for an unruly dog.

It will be seen further that this harness is very sturdy and of strong, reliable construction. Further, it will be seen that the harness may be cheaply produced and will have an attractive and pleasing appearance.

Although the invention has been described in considerable detail, such description is intended as illustrative rather than limiting as the invention may be variously embodied and as the scope of such invention is to be determined as claimed.

I claim:

1. A dog harness comprising an upper pad having a plurality of spaced slots therein, a collar loop and a body loop formed of a single continuous strap, a martingale joining the lower portion of the body loop and collar loop, said strap having a portion continuing outwardly from adjacent the upper pad and forming a lead strap.

2. A dog harness comprising an upper pad provided with a plurality of spaced slots therein, a continuous strap threaded through the slots and passing diagonally in crossed relation in reference to the top pad and forming a neck loop and a body loop, said strap having a buckle at one end and having an extended portion threaded through the buckle and projecting therefrom to form a lead strap.

3. A dog harness comprising an upper pad provided with a plurality of spaced slots therein, a continuous strap threaded through the slots and passing diagonally in crossed relation in reference to the top pad and forming a neck loop and a body loop, said strap having a buckle at one end and having an extended portion threaded through the buckle and projecting therefrom to form a lead strap, said lead strap being adapted to extend directly from the collar loop to cause a choke collar action and adapted to be threaded through certain of the slots in said top pad and to be used as an ordinary lead strap.

4. A dog harness comprising a top pad having a plurality of slots therein and having eyelets, a single continuous strap forming a neck loop and a body loop and threaded through said slots and crossing diagonally with reference to the body portion, said strap having an extended portion provided with a hook, said extended portion being adapted for wrapping around the body loop, and the hook being adapted to engage one of said eyelets, said harness having a martingale joining the lower portion of the neck loop and the body loop.

5. A dog harness comprising a top pad having a plurality of slots therein and having eyelets, a single continuous strap forming a neck loop and a body loop and threaded through said slots and crossing diagonally with reference to the body portion, said strap having an extended portion provided with a hook, said extended portion being adapted for wrapping around the body loop, and the hook being adapted to engage one of said eyelets, said harness having a martingale joining the lower portion of the neck loop and the body loop, said martingale being adjustably attached to the lower portion of the neck loop, whereby as said neck loop is adjusted said martingale may be also adjusted to maintain its central position with respect to the neck loop.

In testimony that I claim the foregoing I have hereunto set my hand at Manitowoc, in the county of Manitowoc and State of Wisconsin.

VICTOR D. PLANTICO.